United States Patent
Reed et al.

(10) Patent No.: US 9,805,435 B2
(45) Date of Patent: Oct. 31, 2017

(54) FULL COLOR VISIBILITY MODEL USING CSF WHICH VARIES SPATIALLY WITH LOCAL LUMINANCE

(71) Applicant: Digimarc Corporation, Beaverton, OR (US)

(72) Inventors: Alastair M. Reed, Lake Oswego, OR (US); Kristyn R. Falkenstern, Portland, OR (US); David Berfanger, Vancouver, WA (US); Yang Bai, Beaverton, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 15/426,630

(22) Filed: Feb. 7, 2017

(65) Prior Publication Data

US 2017/0236239 A1    Aug. 17, 2017

Related U.S. Application Data

(63) Continuation of application No. 15/137,401, filed on Apr. 25, 2016, now Pat. No. 9,565,335, which is a continuation-in-part of application No. 14/588,636, filed on Jan. 2, 2015, now Pat. No. 9,401,001.

(60) Provisional application No. 61/923,060, filed on Jan. 2, 2014, provisional application No. 62/152,745, filed on Apr. 24, 2015.

(51) Int. Cl.
G06K 9/00 (2006.01)
G06T 1/00 (2006.01)
H04N 7/167 (2011.01)

(52) U.S. Cl.
CPC .... G06T 1/0028 (2013.01); *G06T 2201/0051* (2013.01); *G06T 2201/0083* (2013.01)

(58) Field of Classification Search
USPC ............... 382/100, 103, 162–168, 173, 181, 382/232–233, 240, 243, 250, 254, 274, 382/276, 286–291, 305, 312, 235; 235/382; 340/568.1; 380/200, 201
See application file for complete search history.

(56) References Cited

U.S. PATENT DOCUMENTS

| | | | |
|---|---|---|---|
| 5,394,483 A | 2/1995 | Daly | |
| 5,636,292 A * | 6/1997 | Rhoads | G06Q 20/341 235/382 |
| 5,721,788 A * | 2/1998 | Powell | G06Q 20/341 380/200 |
| 5,862,260 A | 1/1999 | Rhoads | |
| 5,905,819 A | 5/1999 | Daly | |
| 6,122,403 A | 9/2000 | Rhoads | |
| 6,130,741 A | 10/2000 | Wen et al. | |

(Continued)

OTHER PUBLICATIONS

U.S. Appl. No. 14/932,645, filed Nov. 4, 2015.

(Continued)

*Primary Examiner* — Seyed Azarian
(74) *Attorney, Agent, or Firm* — Digimarc Corporation

(57) ABSTRACT

The present disclosure relate generally to image signal processing, color science and signal encoding. Digital watermarking can be applied to color image data through use of a luminance contrast sensitivity function and a chrominance contrast sensitive function. Of course, other features, combinations and claims are disclosed as well.

20 Claims, 14 Drawing Sheets
(12 of 14 Drawing Sheet(s) Filed in Color)

(56) References Cited

U.S. PATENT DOCUMENTS

| | | | |
|---|---|---|---|
| 6,345,104 B1 | 2/2002 | Rhoads | |
| 6,408,082 B1 | 6/2002 | Rhoads et al. | |
| 6,449,377 B1 | 9/2002 | Rhoads | |
| 6,559,975 B1 | 5/2003 | Tolmer et al. | |
| 6,590,996 B1 | 7/2003 | Reed et al. | |
| 6,614,914 B1 | 9/2003 | Rhoads et al. | |
| 6,631,198 B1 | 10/2003 | Hannigan et al. | |
| 6,718,046 B2 | 4/2004 | Reed et al. | |
| 6,721,439 B1 | 4/2004 | Levy et al. | |
| 6,763,123 B2 | 7/2004 | Reed et al. | |
| 6,763,124 B2 | 7/2004 | Alattar et al. | |
| 6,792,129 B1 | 9/2004 | Zeng et al. | |
| 6,885,757 B2 | 4/2005 | Bloom et al. | |
| 6,891,959 B2 | 5/2005 | Reed et al. | |
| 6,912,295 B2 | 6/2005 | Reed et al. | |
| 6,947,571 B1 | 9/2005 | Rhoads et al. | |
| 6,993,149 B2 * | 1/2006 | Brunk | G06K 15/02 382/100 |
| 7,027,614 B2 | 4/2006 | Reed | |
| 7,070,252 B2 | 7/2006 | DeQueiroz et al. | |
| 7,298,865 B2 | 11/2007 | Lubin et al. | |
| 7,352,878 B2 | 4/2008 | Reed et al. | |
| 7,783,130 B2 | 8/2010 | Watson | |
| 8,094,869 B2 | 1/2012 | Reed et al. | |
| 8,199,969 B2 | 6/2012 | Reed | |
| 8,310,718 B2 | 11/2012 | Chapman et al. | |
| 8,422,795 B2 | 4/2013 | Pahalawatta et al. | |
| 8,437,403 B2 | 5/2013 | Babonneau et al. | |
| 8,913,780 B2 | 12/2014 | Reed et al. | |
| 8,971,567 B2 | 3/2015 | Reed et al. | |
| 9,136,300 B2 | 9/2015 | Rhoads | |
| 9,179,033 B2 | 11/2015 | Reed et al. | |
| 9,245,308 B2 | 1/2016 | Reed | |
| 9,380,186 B2 | 6/2016 | Reed et al. | |
| 9,401,001 B2 | 7/2016 | Reed et al. | |
| 9,449,357 B1 | 9/2016 | Lyons et al. | |
| 9,565,335 B2 | 2/2017 | Reed et al. | |
| 2002/0126872 A1 * | 9/2002 | Brunk | G06K 9/00744 382/100 |
| 2005/0114667 A1 | 5/2005 | Haas | |
| 2006/0165311 A1 | 7/2006 | Watson | |
| 2009/0135013 A1 * | 5/2009 | Kushida | G06Q 30/02 340/568.1 |
| 2010/0150434 A1 | 6/2010 | Reed | |
| 2012/0014557 A1 | 1/2012 | Reed et al. | |
| 2013/0329006 A1 | 12/2013 | Boles et al. | |
| 2014/0119593 A1 | 5/2014 | Filler | |
| 2015/0156369 A1 | 6/2015 | Reed et al. | |
| 2015/0187039 A1 | 7/2015 | Reed et al. | |
| 2016/0198064 A1 | 7/2016 | Bai et al. | |

OTHER PUBLICATIONS

U.S. Appl. No. 62/102,247, filed Jan. 12, 2015.
U.S. Appl. No. 61/923,060, filed Jan. 2, 2014.
U.S. Appl. No. 13/975,919, filed Aug. 26, 2013.
Feb. 1, 2016 Non-final Action, Feb. 12, 2016 Amendment, Mar. 4, 2016 Notice of Allowance, May 20, 2016 Amendment after Notice of Allowance and Applicant Summary of interview with Examiner, all from parent U.S. Pat. No. 9,401,001.
Jan. 4, 2016 Amendment and Dec. 30, 2015 non-final Action, each from assignee's U.S. Appl. No. 14/616,686 (published as US 20150156369 A1).
International Search Report and Written Opinion dated Nov. 25, 2015 from PCT/US2015/044904 (published as WO 2016025631 A1).
WO 2016025631 A1, published Feb. 18, 2016.
Battiato et al., "Robust Watermarking for Images Based on Color Manipulation," IH/99 LNCS 1768, pp. 302-317, 2000.
Scott Daly, "Application of a Noise-Adaptive Contrast Sensitivity Function to Image Data Compression," Optical Engineering, Aug. 1990, vol. 29. No. 8, pp. 977-987.
Scott J. Daly, "Visible differences predictor: an algorithm for the assessment of image fidelity", Proc. SPIE 1666, Human Vision, Visual Processing, and Digital Display III, 2 (Aug. 27, 1992).
Deshpande, K. and Green, P. "A simplified method of predicting the colorimetry of spot color overprints," 18th Color Imaging Conference: Color Science and Engineering Sys., Tech. and Applications, p. 213-216, San Antonio, USA 2010.
Fleet et al., "Embedding Invisible Information in Color Images," Proc. Int. Conf. on Image Processing, vol. 1, pp. 523-535, Oct. 1997.
Itti et al., "A Model of Saliency-Based Visual Attention for Rapid Scene Analysis," IEEE Transactions on Pattern Analysis and Machine Intelligence, vol. 20, No. 11, Nov. 1998, pp. 1254-1259.
R. Lyons et al, "Geometric enumerated chrominance watermark for spot colors," In Q. Lin, J.P. Alleback and Z. Fan, editors, Proceedings SPIE 8664, Imaging and Printing in a Web 2.0 World IV, vol. 8664, Mar. 2013.
Piva et al., "Exploiting the Cross-Correlation of RGB-Channels for Robust Watermarking of Color Images," 1999 IEEE, pp. 306-310.
Reed et al, "Adaptive Color Watermarking," Proc. SPIE, vol. 4675, pp. 222-229, 8 pages, Jan. 21, 2002.
Reed et al., "Full-color visibility model using CSF which varies spatially with local luminance." In Q. Lin, J. P. Allebach, and Z. Fan, editors, Proc. SPIE 9027, Imaging and Multimedia Analytics in a Web and Mobile World 2014, vol. 9027, 2014.
Reed et al., "Watermarking Spot Colors in Packaging," Media Watermarking, Security and Forensics 2015, edited by Adnan M. Alattar, Nasir D. Memon, Chad D. Heitzenrater, Proc. of SPIE-IS&T vol. 9409, 940906.
Reed et al., "Full-color visibility model using CSF which varies spatially with local luminance," PowerPoint slides presented at Imaging and Multimedia Analytics in a Web and Mobile World 2014 conf., San Francisco, CA, United States, Feb. 5, 2014.
Van der Horst et al. "Spatiotemporal chromaticity discrimination," Journal of Optical Society of America, vol. 59, issue 11, 1969.
Van Nes et al. "Spatial modulation transfer in the human eye," Journal of Optical Society of America, vol. 57, issue 3, pp. 401-406, 1967.
Vidal, "Non-Noticeable Information Embedding in Color Images: Marking and Detection," 1999 IEEE, pp. 293-297.
A. Wachter and L. T. Biegler, "On the implementation of a primal-dual interior point filter line search algorithm for large-scale nonlinear programming" Mathematical Programming, vol. 106, issue (1): pp. 25-57, 2006.
A. B. Watson, J. Hu, and J.F. McGowan III, "Digital Video Quality Metric Based on Human Vision," Journal of Electronic Imaging, vol. 10, No. 1, pp. 20-29 (2001).
Wyble et al., "A critical review of spectral models applied to binary color printing," Color Research & Application, 25(1):4-19, 2000.
X. Zhang and B. A. Wandell, e.g., "A spatial extension of CIELAB for digital color image reproduction," in Proceedings of the Society of Information Display Symposium (SID '96), vol. 27, pp. 731-734, San Jose, Calif, USA, Jun. 1996.

* cited by examiner

FULL COLOR VISIBILITY MODEL USING CSF WHICH VARIES SPATIALLY WITH LOCAL LUMINANCE

RELATED APPLICATION DATA

This patent application is a continuation of U.S. patent application Ser. No. 15/137,401, filed Apr. 25, 2016 (now U.S. Pat. No. 9,565,335), which is a continuation in part of U.S. patent application Ser. No. 14/588,636, filed Jan. 2, 2015 (now U.S. Pat. No. 9,401,001), which claims the benefit of U.S. Provisional Patent Application No. 61/923,060, filed Jan. 2, 2014. U.S. patent application Ser. No. 15/137,401 also claims the benefit of U.S. Provisional Patent Application No. 62/152,745, filed Apr. 24, 2015. Each of these patent documents are hereby incorporated herein by reference in its entirety.

This application is related to U.S. Pat. Nos. 9,224,184, 9,129,277 and 8,199,969; U.S. Published Patent Application Nos. U.S. 2010-0150434 A1, U.S. 2014-0119593 A1, U.S. 2015-0156369 A1; and U.S. patent application Ser. No. 13/975,919, filed Aug. 26, 2013 (U.S. Pat. No. 9,449,357).

The above patent documents are each hereby incorporated herein by reference in their entirety.

TECHNICAL FIELD

The present disclosure relates generally to color science, image processing, steganographic data hiding and digital watermarking.

BACKGROUND AND SUMMARY

The term "steganography" generally means data hiding. One form of data hiding is digital watermarking. Digital watermarking is a process for modifying media content to embed a machine-readable (or machine-detectable) signal or code into the media content. For the purposes of this application, the data may be modified such that the embedded code or signal is imperceptible or nearly imperceptible to a user, yet may be detected through an automated detection process. Most commonly, digital watermarking is applied to media content such as images, audio signals, and video signals.

Digital watermarking systems may include two primary components: an embedding component that embeds a watermark in media content, and a reading component that detects and reads an embedded watermark. The embedding component (or "embedder" or "encoder") may embed a watermark by altering data samples representing the media content in the spatial, temporal or some other domain (e.g., Fourier, Discrete Cosine or Wavelet transform domains). The reading component (or "reader" or "decoder") analyzes target content to detect whether a watermark is present. In applications where the watermark encodes information (e.g., a message or payload), the reader may extract this information from a detected watermark.

A watermark embedding process may convert a message, signal or payload into a watermark signal. The embedding process then combines the watermark signal with media content and possibly another signals (e.g., an orientation pattern or synchronization signal) to create watermarked media content. The process of combining the watermark signal with the media content may be a linear or non-linear function. The watermark signal may be applied by modulating or altering signal samples in a spatial, temporal or some other transform domain.

A watermark encoder may analyze and selectively adjust media content to give it attributes that correspond to the desired message symbol or symbols to be encoded. There are many signal attributes that may encode a message symbol, such as a positive or negative polarity of signal samples or a set of samples, a given parity (odd or even), a given difference value or polarity of the difference between signal samples (e.g., a difference between selected spatial intensity values or transform coefficients), a given distance value between watermarks, a given phase or phase offset between different watermark components, a modulation of the phase of the host signal, a modulation of frequency coefficients of the host signal, a given frequency pattern, a given quantizer (e.g., in Quantization Index Modulation) etc.

The present assignee's work in steganography, data hiding and digital watermarking is reflected, e.g., in U.S. Pat. Nos. 6,947,571; 6,912,295; 6,891,959. 6,763,123; 6,718,046; 6,614,914; 6,590,996; 6,408,082; 6,122,403 and 5,862,260, and in published specifications WO 9953428 and WO 0007356 (corresponding to U.S. Pat. Nos. 6,449,377 and 6,345,104). Each of these patent documents is hereby incorporated by reference herein in its entirety. Of course, a great many other approaches are familiar to those skilled in the art. The artisan is presumed to be familiar with a full range of literature concerning steganography, data hiding and digital watermarking.

One possible combination of the inventive teaching is a method including: receiving a color image or video; transforming the color image or video signal by separating the color image or video into at least first data representing a first color channel of the color image or video and second data representing a second color channel of the color image or video, where the first data comprises a digital watermark signal embedded therein and the second data comprises the digital watermark signal embedded therein with a signal polarity that is inversely related to the polarity of the digital watermark signal in the first data; subtracting the second data from the first data to yield third data; using at least a processor or electronic processing circuitry, analyzing the third data to detect the digital watermark signal; once detected, providing information associated with the digital watermark signal.

Another combination is a method including: obtaining first data representing a first chrominance channel of a color image or video, where the first data comprises a watermark signal embedded therein; obtaining second data representing a second chrominance channel of the color image or video, the second data comprising the watermark signal embedded therein but with a signal polarity that is inversely related to the polarity of the watermark signal in the first data; combining the second data with the first data in manner that reduces image or video interference relative to the watermark signal, said act of combining yielding third data; using at least a processor or electronic processing circuitry, processing the third data to obtain the watermark signal; once obtained, providing information associated with the watermark signal.

Still another combination is an apparatus comprising: a processor or electronic processing circuitry to control: (a) handling of first data representing a first color channel of a color image or video, where the first data comprises a watermark signal embedded therein; (b) handling of second data representing a second color channel of the color image or video, the second data comprising the watermark signal embedded therein but with a signal polarity that is inversely related to the polarity of the watermark signal in the first data; (c) combining the second data with the first data in manner that reduces image or video interference relative to the watermark signal, the combining yielding third data; (d) processing the third data to obtain the watermark signal; and (e) once obtained, providing information associated with the watermark signal.

Yet another possible combination is a method including: a method including: obtaining first data representing a first chrominance channel of a color image or video signal; obtaining second data representing a second chrominance channel of the color image or video signal; using a processor or electronic processing circuitry, embedding a watermark signal in the first data with a first signal polarity; using a processor or electronic processing circuitry, transforming the second data by embedding the watermark signal in the second data so that when embedded in the second data the watermark signal comprises a second signal polarity that is inversely related to the first signal polarity of the watermark signal in the first data; combining the watermarked first data and the watermarked second data to yield a watermarked version of the color image or video signal, whereby during detection of the watermark signal from the watermarked version of the color image or video signal, the second data is combined with the first data in a manner that reduces image or video signal interference relative to the watermark signal.

Still a further combination is a digital watermarking method comprising: using a programmed electronic processor, modeling a first color ink and a second color ink in terms of CIE Lab values; modulating the values with a watermarking signal; scaling the modulated values in a spatial frequency domain; spatially masking the scaled, modulated values; providing the spatially masked, scaled, modulated values, such values carrying the watermark signal.

Another combination includes an apparatus, comprising: memory for storing: i) a luminance contrast sensitivity function (CSF1), ii) a chrominance contrast sensitivity function (CSF2), and iii) data representing color imagery; and one or more processors configured for: applying the CSF1 and the CSF2 to predict degradation of image areas associated with an application of digital watermarking to the data representing color imagery, in which the CSF1 varies depending on luminance values associated with local regions of the data representing color imagery and in which the CSF1 is used for processing luminance data and the CSF2 is used for processing chrominance data; transforming the data representing color imagery with digital watermark, in which the digital watermarking is guided based on results obtained from the applying including predicted degradation of image areas.

In one implementation the CSF1 varies spatially, perhaps in terms of spatial width. In another implementation, the CSF2 varies spatially in terms of spatial width.

The CSF1 may be applied to predict degradation of image areas produces image blurring as the predicted degradation, in which the CSF1 varies so that relatively more blurring occurs as luminance of a local image region decreases.

In some implementations the digital watermarking is guided based on results obtained from the applying by varying embedding strength across different image areas of the data representing color imagery based on predicted degradation of the different image areas. The predicted degradation of the digital watermarking across the different image areas may include uniform predicted degradation.

The one or more processors may be configured for processing the data representing color imagery with an attention model to predict visual traffic areas.

In other implementations the digital watermarking may be guided based on the results obtained from the predicted visual traffic areas and the predicted degradation of image areas.

In some cases, the chrominance contrast sensitivity function (CSF2) includes a blue-yellow contrast sensitivity function and a red-green contrast sensitivity function.

The CSF2 may vary depending on luminance values associated with local regions of the obtained color image data.

The transforming the data representing color imagery with digital watermarking may embed a machine-readable code into the data representing color imagery. And, in some cases, the imagery comprises video.

Further combinations, aspects, implementations, features and advantages will become even more apparent with reference to the following detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Portions of the following disclosure discusses a digital watermarking technique that utilizes at least two chrominance channels (also called "color planes," "color channels" and/or "color direction"). Chrominance is generally understood to include information, data or signals representing color components of an image or video. In contrast to a color image or video, a grayscale (monochrome) image or video has a chrominance value of zero.

Figure 1:
FIG. 1 represents a color image.
Figure 2:
FIG. 2 represents a first color channel ('a' channel) of the color image representation shown in FIG. 1.
Figure 3:
FIG. 3 represents a second color channel ('b' channel) of the color image representation shown in FIG. 1.

Media content that includes a color image (or color video) is represented in FIG. 1. An industry standard luminance and chrominance color space is called "Lab" (for Lightness (or luminance), plus 'a' and 'b' color channels) that can be used to separate components of images and video. FIG. 2 is an 'a' channel representation of FIG. 1 (shown in grayscale), and FIG. 3 is a 'b' channel representation of FIG. 1 (shown in grayscale). Of course, our inventive methods and apparatus will apply to and work with other color schemes and techniques as well. For example, alternative luminance and chrominance color schemes include "Yuv" (Y=luma, and 'u' and 'v' represent chrominance channels) and "Ycc." (also a dual chrominance space representation).

Figure 4:
FIG. 4 is a representation of the sum of the first color channel of FIG. 2 and the second color channel of FIG. 3 (e.g., a+b).
Figure 5:
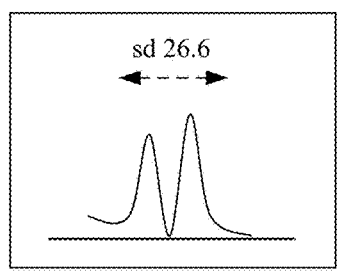
FIG. 5 is a graph showing a histogram standard deviation of FIG. 4.
Figure 6:
FIG. 6 is a representation of the difference between the first color channel of FIG. 2 and the second color channel of FIG. 3 (a−b).
Figure 7:
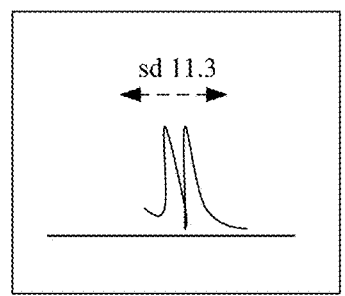
FIG. 7 is a graph showing a histogram standard deviation of FIG. 6.

Let's first discuss the additive and subtractive effects on FIGS. 2 and 3. FIG. 4 illustrates a representation of the result of adding the 'a' channel (FIG. 2) with the 'b' channel (FIG. 3). FIG. 6 illustrates a representation of the result of subtracting the 'b' channel (FIG. 3) from the 'a' channel (FIG. 2). The result of subtracting the 'b' channel from the 'a' channel yields reduced image content relative to adding the two channels since the 'a' and 'b' color planes have correlated image data in the Lab scheme. (In typical natural imagery, the 'a' and 'b' chrominance channels tend to be correlated. That is to say where 'a' increases, 'b' also tends to increase. One measure of this is to measure the histogram of the two chrominance planes when they are added (see FIG. 5), and compare that to the histogram when the two color planes are subtracted (see FIG. 7). The fact that the standard deviation of FIG. 7 is about half that of FIG. 5 also supports this conclusion, and illustrates the reduction in image content when 'b' is subtracted from 'a'.) In this regard, FIG. 4 provides enhanced or emphasized image content due to the correlation. Said another way, the subtraction of the FIG. 3 image from FIG. 2 image provides less image interference or reduces image content. The histogram representations of FIG. 4 and FIG. 6 (shown in FIGS. 5 and 7, respectively) further support this conclusion.

Now let's consider watermarking in the context of FIGS. 2 and 3.

In a case where a media signal includes (or may be broken into) at least two chrominance channels, a watermark embedder may insert digital watermarking in both the 'a' color direction (FIG. 2) and 'b' color direction (FIG. 3). This embedding can be preformed in parallel (if using two or more encoders) or serial (if using one encoder). The watermark embedder may vary the gain (or signal strength) of the watermark signal in the 'a' and 'b' channel to achieve improved hiding of the watermark signal. For example, the 'a' channel may have a watermark signal embedded with signal strength that greater or less than the watermark signal in the 'b' channel. Alternatively, the watermark signal may be embedded with the same strength in both the 'a' and 'b' channels. Regardless of the watermark embedding strength, watermark signal polarity is preferably inverted in the 'b' color plane relative to the 'a' color plane. The inverted signal polarity is represented by a minus ("−") sign in equations 1 and 2.

$$WMa = a(\text{channel}) + wm \quad (1)$$

$$WMb = b(\text{channel}) - wm \quad (2)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained (from optical scan data, memory, transmission channel, etc.), and data representing the color image is communicated to a watermark detector for analysis. The detector (or a process, processor or electronic processing circuitry used in conjunction with the detector) subtracts WMb from WMa resulting in WMres as shown below:

$$WMres = WMa - WMb \quad (3)$$

$$WMres = (a + wm) - (b - wm) \quad (4)$$

$$WMres = (a - b) + 2*wm \quad (5)$$

This subtraction operation yields reduced image content (e.g., FIG. 6) as discussed above. The subtraction or inverting operation of the color channels also emphasizes or increases the watermark signal (2*wm), producing a stronger watermark signal for watermark detection. Indeed, subtracting the color channels increases the watermark signal-to-media content ratio: WMres=(a−b)+2*wm.

Figure 8:
FIG. 8 is an image representation of the difference between the first color channel of FIG. 2 (including a watermark signal embedded therein) and the second color channel of FIG. 3 (including the watermark signal embedded therein).
Figure 9:
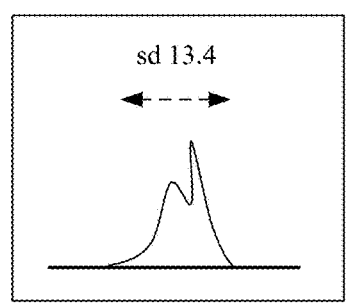
FIG. 9 is a graph showing a histogram standard deviation of FIG. 8.

FIG. 8 illustrates the result of equation 5 (with respect to watermarked versions of FIG. 2 and FIG. 3). As shown, the perceptual "graininess" or "noise" in the image corresponds to the emphasized watermark signal. The image content is also reduced in FIG. 8. A histogram representation of FIG. 8 is shown in FIG. 9 and illustrates a favorable reduction of image content.

A watermark detector may extract or utilize characteristics associated with a synchronization signal (if present) from a frequency domain representation of WMres. The detector may then use this synchronization signal to resolve scale, orientation, and origin of the watermark signal. The detector may then detect the watermark signal and obtain any message or payload carried thereby.

To even further illustrate the effects of improving the watermark signal-to-media content ratio with our inventive processes and systems, we provide some additive and subtractive examples in the content of watermarking.

For the following example, a watermark signal with the same polarity is embedded in each of the 'a' color channel and the 'b' color channel. The same signal polarity is represented by a plus ("+") sign in equations 6 and 7.

$$WMa = a + wm \quad (6)$$

$$WMb = b + wm \quad (7)$$

WMa is a watermarked 'a' channel, WMb is a watermarked 'b' channel, and wm represents a watermark signal. A watermarked color image (including L and WMb and WMa) can be provided, e.g., for printing, digital transfer or viewing.

An embedded color image is obtained, and data representing the color image is communicated to a watermarked detector for analysis. The detector (or a process, processor, or electronic processing circuitry used in conjunction with the detector) adds the 'a' and 'b' color channels to one another (resulting in WMres) as shown below:

$$WMres = WMa + WMb \quad (8)$$

$$WMres = (a+wm) + (b+wm) \quad (9)$$

$$WMres = (a+b) + 2*wm \quad (10)$$

This addition operation results in increased image content (e.g., FIG. 4). Indeed, image interference during watermark detection will be greater since the two correlated 'a' and 'b' color channels tend to reinforce each other.

By way of further example, if WMb is subtracted from WMa (with watermark signals having the same polarity), the following results:

$$WMres = WMa - WMb \quad (11)$$

$$WMres = (a+wm) - (b+wm) \quad (12)$$

$$WMres = (a-b) + \approx 0*wm \quad (13)$$

A subtraction or inverting operation in a case where a watermark signal includes the same polarity decreases image content (e.g., FIG. 4), but also significantly decreases the watermark signal. This may result in poor—if any—watermark detection.

Figure 10A:
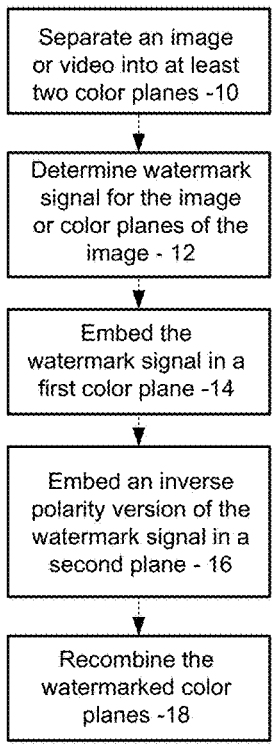
FIGS. 10A and 10B are block diagrams showing, respectively, an embedding process and a detection process.
Figure 10B:
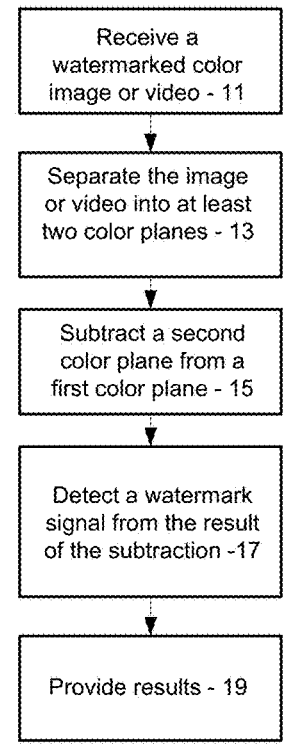

FIGS. 10A and 10B are flow diagrams illustrating some related processes and methods. These processes may be carried out, e.g., via a computer processor, electronic processing circuitry, printer, handheld device such as a smart cell phone, etc.

With reference to FIG. 10A, a color image (or video) is obtained and separated into at least two (2) color channels or planes (10). A watermark signal is determined for the color image or video (12). Of course, the watermark signal for the color image or video may be determined prior to or after color plane separation. The determined watermark signal is embedded in a first of the color planes (14). An inverse polarity version of the watermark signal is embedded in a second color plane. The color planes are recombined (perhaps with data representing luminance) to form a composite color image.

With reference to FIG. 10B, a watermarked color image or video is obtained or received (11). The color image (or video) has or can be separated into at least two (2) color planes or channels (13). A first color plane includes a watermark signal embedded therein. A second color plane includes the watermark signal embedded therein with a polarity that is inversely related to the watermark signal in the first color plane. The watermarked second color plane is subtracted from the watermarked first color (15). The result of the subtraction is analyzed to detect the watermark signal. A detected watermark message, signal or payload can be provided (19), e.g., to a remote database to obtain related metadata or information, to a local processor, for display, to a rights management system, to facilitate an online transaction, etc.

In addition to the Lab color scheme discussed above, a watermark signal may be embedded in color image (or video) data represented by RGB, Yuv, Ycc, CMYK or other color schemes, with, e.g., a watermark signal inserted in a first chrominance direction (e.g., red/green direction, similar to that discussed above for the 'a' channel) and a second chrominance direction (e.g., a blue/yellow direction, similar to that discussed above for the 'b' channel). For watermark signal detection with an alternative color space, e.g., an RGB or CMYK color space, an image can be converted to Lab (or other color space), or appropriate weights of, e.g., RGB or CMY channels, can be used. For example, the following RGB weights may be used to calculate 'a'–'b': Chrominance Difference=0.35*R−1.05*G+0.70*B+128, where R, G and B are 8-bit integers.

Further Considerations of Video

The human contrast sensitivity function curve shape with temporal frequency (e.g., relative to time) has a very similar shape to the contrast sensitivity with spatial frequency.

Successive frames in a video are typically cycled at about at least 60 Hz to avoid objectionable visual flicker. So-called "flicker" is due to the high sensitivity of the human visual system (HVS) to high temporal frequency changes in luminance. The human eye is about ten (10) times less sensitive to high temporal frequency chrominance changes.

Figure 11:
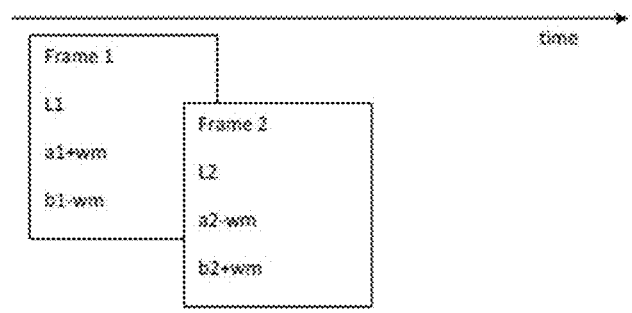
FIG. 11 is a diagram showing watermarks embedded in first and second video frames.

Consider a video sequence with frames as shown in FIG. 11. A chrominance watermark can be added to frame 1 per the above description for images. In a similar way, a watermark is added to frame 2 but the polarity is inverted as shown in FIG. 11.

In order to recover the watermark, pairs of frames are processed by a watermark detector, and the 'a' channels are subtracted from each other as shown below.

$$Det\_a = (a1+wm) - (a2-wm) = (a1-a2) + 2*wm \quad (14)$$

Det_a refers to watermark detection processing of the 'a' channel. Because of the temporal correlation between frames, the image content in equation 14 is reduced while the watermark signal is reinforced.

In a similar way the 'b' channels are also subtracted from each other $$Det\_b = (b1-wm) - (b2+wm) = (b1-b2) - 2*wm \quad (15)$$

Det_a refers to watermark detection processing of the 'b' channel. Equation 14 and 15 are then subtracted from each other as shown below in equation 16.

$$Det\_a - Det\_b = (a1 - a2 + 2*wm) - (b1 - b2 - 2*wm) \quad (16)$$
$$= (a1 - a2) - (b1 - b2) + 4*wm$$

In generally, related (but not necessarily immediately adjacent) frames will have spatially correlated content. Because of the spatial correlation between the 'a' and 'b' frames, the image content is reduced while the watermark signal is reinforced. See equation 16.

For any one pair of frames selected by a watermark detector, the polarity of the watermark could be either positive or negative. To allow for this, the watermark detector may examine both polarities.

Watermark Embedding for Spot Colors

Product packaging is usually printed in one of two ways:

1. Process color printing using cyan, magenta yellow and/or black (CMYK)

2. Spot color printing (e.g., using special Pantone color or other ink sets)

The majority of packaging is printed using spot colors mainly for reasons of cost and color consistency, and to achieve a wide color gamut over various packaging. Some conventional watermarking techniques embed digital watermarks in either CMYK for printed images or RGB for digital images that are being displayed. But how to embed a watermark with a spot color?

An improvement addresses problem associated with watermarking spot color images. Preferably, packaging contains two (2) or more spot colors (e.g., printed cooperatively to achieve a certain color consistency). Each different color is altered to collectively carry a watermark signal. A maximum signal strength within a user selectable visibility constraint with watermark in at least two (2) of the spot.

A maximized watermark signal is embedded preferably by modulating the spot color inks within a certain visibility constraint across the image. The approach models a color (ink) in terms of CIE Lab values. Lab is a uniform perceptual color space where a unit difference in any color direction corresponds to an equal perceptual difference.

The Lab axes are then scaled for the spatial frequency of the watermark being added to the image, in a similar manner to the Spatial CieLab model by X. Zhang and B. A. Wandell, e.g., "A spatial extension of CIELAB for digital color image reproduction," in Proceedings of the Society of Information Display Sumposium (SID '96), vol. 27, pp. 731-734, San Jose, Calif., USA, June 1996. This is a uniform perceptual color space which we will call SLAB, where a unit difference in any color direction corresponds to an equal perceptual difference due to the addition of a watermark signal at that spatial frequency.

The allowable visibility magnitude in SLAB is scaled by spatial masking of the cover image. Spatial masking of the cover image can include the techniques described by Watson in US Published Patent Application No. US 2006-0165311 A1, which is hereby incorporated by reference in its entirety, and can be used to scale the allowable visibility across the image. This is a uniform perceptual color space which we will call VLAB, where the visibility circle is scaled to correspond to an equal perceptual difference due to the addition of a watermark signal at that spatial frequency for that particular image.

The chrominance embedding techniques discussed above forms the foundation for the present watermark embedding techniques. A related discussion is found in U.S. patent application Ser. No. 13/975,919, filed Aug. 26, 2013, under the section "Chrominance watermark to embed using a full color visibility model," which uses an iterative embed technique to insert a maximum watermark signal into CMYK images.

The spot color technique described extends this work to embedding that supports special color inks (e.g., spot colors) used in packaging and uses a full color visibility model with spatial masking. A geometric enumerated embed approach can be used to evaluate a range of possible ink changes, which meet the user selected visibility constraint and press constraints. The set of allowable ink changes are evaluated to choose the pair of ink changes which result in the maximum signal strength while meeting the visibility and press constraints.

Figure 12:
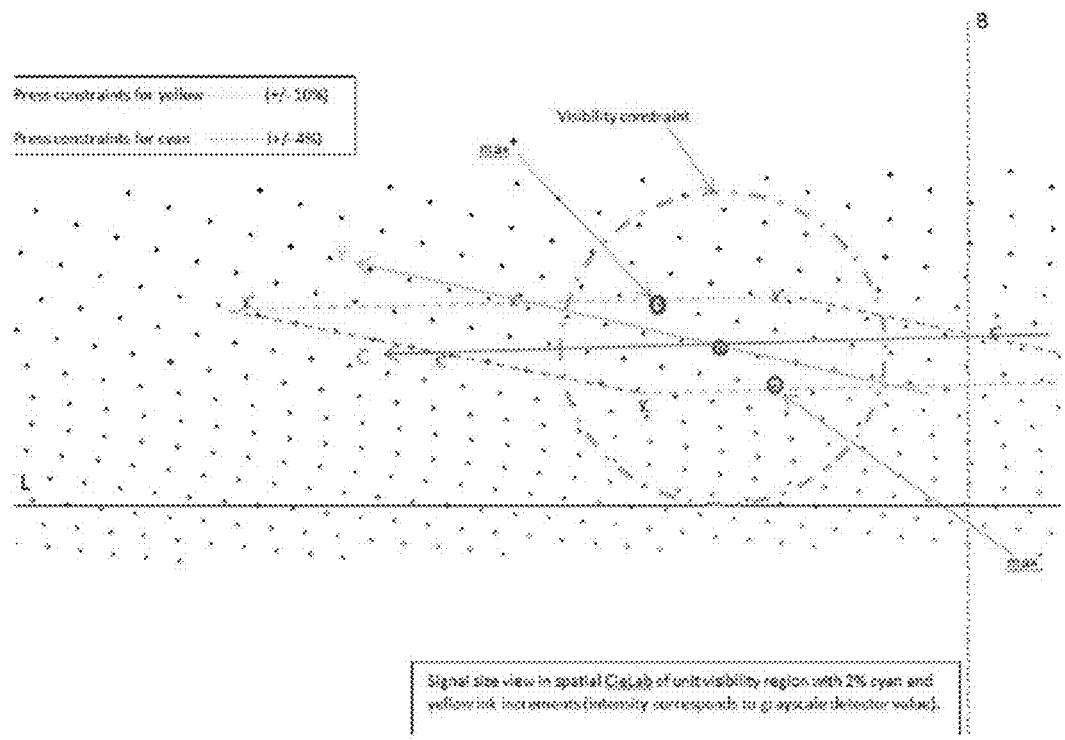
FIG. 12 is a diagram showing a detailed signal size view with ink increments of 2%, and the addition of press visibility constraints.

FIG. 12 shows a detailed signal size view with ink increments of 2%, and the addition of press constraints.

A user can insert a maximum watermark signal, while meeting any pre-required visibility constraint. The method has been applied to the case of two spot colors and images have been produced which are more than twice as robust to Gaussian noise as a single color image which is embedded using a luminance only watermark to the same visibility.

A method has been described which allows an image containing 2 or more spot colors to be embedded with a watermark in 2 of the spot colors, with the maximum signal strength within a user selectable visibility constraint.

A look-up table based approach can be used for given colors at given locations, and can easily be extended to 3 or more dimensions while still being computationally reasonable.

Additional related disclosure is found in U.S. patent application Ser. No. 13/975,919, under the heading sections "Geometric Enumerated Chrominance Watermark Embed for Spot Colors" and "Watermarking Embedding in Optimal Color Direction."

Full-Color Visibility Model

A full color visibility model has been developed that uses separate contrast sensitivity functions (CSFs) for contrast variations in luminance and chrominance (red-green and blue-yellow) channels. The width of the CSF in each channel can be varied spatially depending on the luminance of the local image content. The CSF can be adjusted so that relatively more blurring occurs as the luminance of the local region decreases. The difference between the contrast of the blurred original and marked image can be measured using a color difference metric.

This spatially varying CSF performed better than a fixed CSF in the visibility model, approximating subjective measurements of a set of test color patches ranked by human observers for watermark visibility.

A full color visibility model can be a powerful tool to measure visibility of an image watermark. Watermarks used for packaging can be inserted in the chrominance domain to obtain the best robustness per unit visibility. A chrominance image watermark is preferably embedded in a way that the color component in the cover image is minimally altered and is hardly noticeable, due to human vision system's low sensitivity to color changes.

One example of a color visibility model is discussed relative to Spatial CIELAB (S-CIELAB). The accuracy of this model was tested by comparing it to human subjective tests on a set of watermarked color patches. The model was found to significantly overestimate the visibility of some dark color patches. A correction can be applied to the model for the variation of the human contrast sensitivity function (CSF) with luminance. After luminance correction, better correlation was obtained with the subjective tests.

The luminance and chrominance CSF of the human visual system has been measured for various retinal illumination levels. The luminance CSF variation was measured by Van Nes (1967) and the chrominance CSF variation by van der Horst (1969). These measurements show a variation in peak sensitivity of about a factor of 8 for luminance and 5 for chrominance over retinal illumination levels which change by about a factor of 100.

Since the retinal illumination can change by about a factor of 100 between the lightest to darkest area on a page, the CSF peak sensitivity and shape can change significantly. The function is estimated by the average local luminance on the page, and a spatially dependent CSF is applied to the image. This correction is similar to the luminance masking in adaptive image dependent compression.

The luminance dependent CSF performed better than a fixed CSF in the visibility model, when compared to subjective measurements of a set of test color patches ranked by human observers for watermark visibility. In some cases, we use a method of applying a spatially dependent CSF which depends on local image luminance.

The visibility model can be used to embed watermark into images with equal visibility. During the embedding stage, the visibility model can predict the visibility of the watermark signal and then adjust the embedding strength. The result will be an embedded image with a uniform watermark signal visibility, with the embedding strength varying depending on the cover image's content.

The following documents are hereby incorporated herein by reference: Lyons, et al. "Geometric chrominance watermark embed for spot color," Proc. Of SPIE, vol. 8664, Imaging and Printing in a Web 2.0 World IV, 2013; Zhang et al. "A spatial extension of CIELAB for digital color-image reproduction" Journal of the Society for Information Display 5.1 (1997): 61-63; Van Nes et al. "Spatial modulation transfer in the human eye," Journal of Optical Society of America, vol. 57, issue 3, pp. 401-406, 1967; Van der Horst et al. "Spatiotemporal chromaticity discrimination," Journal of Optical Society of America, vol. 59, issue 11, 1969; and Watson, "DCTune," Society for information display digest of technical papers XXIV, pp. 946-949, 1993.

In some cases, even better results can be achieved by combining an attention model with our above visibility model when embedding watermarks in color image data. An attention model generally predicts where the human eye is drawn to when viewing an image. For example, the eye may seek out flesh tone colors and sharp contrast areas. One example attention model is described in Itti et al., "A Model of Saliency-Based Visual Attention for Rapid Scene Analysis," IEEE TRANSACTIONS ON PATTERN ANALYSIS AND MACHINE INTELLIGENCE, VOL. 20, NO. 11, NOVEMBER 1998, pgs. 1254-1259, which is hereby incorporated herein by reference.

High visual traffic areas identified by the attention model, which would otherwise be embedded with a relatively strong or equal watermark signal, can be avoided or minimized by a digital watermark embedder.

Additional related disclosure is found in Appendix D, attached and included as part of this specification, and which is hereby incorporated herein by reference in its entirety.

Disclosure from Appendix D is also provided below:
Full-Color Visibility Model Using CSF which Varies Spatially with Local Luminance Abstract:

A full color visibility model has been developed that uses separate contrast sensitivity functions (CSFs) for contrast variations in luminance and chrominance (red-green and blue-yellow) channels. The width of the CSF in each channel is varied spatially depending on the luminance of the local image content. The CSF is adjusted so that more blurring occurs as the luminance of the local region decreases. The difference between the contrast of the blurred original and marked image is measured using a color difference metric.

This spatially varying CSF performed better than a fixed CSF in the visibility model, approximating subjective measurements of a set of test color patches ranked by human observers for watermark visibility. The effect of using the CIEDE2000 color difference metric compared to CIEDE1976 (i.e., a Euclidean distance in CIELAB) was also compared.

Introduction

A full color visibility model is a powerful tool to measure the visibility of the image watermark. Image watermarking is a technique that covertly embeds additional information in a cover image, such that the ownership, copyright and other details about the cover image can be communicated. Watermarks used for packaging are inserted in the chrominance domain to obtain the best robustness per unit visibility. See Robert Lyons, Alastair Reed and John Stach, "Geometric chrominance watermark embed for spot color," Proc. Of SPIE, vol. 8664, Imaging and Printing in a Web 2.0 World IV, 2013. The chrominance image watermark is embedded in a way that the color component in the cover image is minimally altered and is hardly noticeable, due to human vision system's low sensitivity to color changes.

This visibility model is similar to Spatial CIELAB (S-CIELAB). See Xuemei Zhang and Brian A. Wandell, "A spatial extension of CIELAB for digital color-image reproduction" Journal of the Society for Information Display 5.1 (1997): 61-63. The accuracy of this model was tested by comparing it to subjective tests on a set of watermarked color patches. The model was found to significantly overestimate the visibility of some dark color patches. A correction was applied to the model for the variation of the human contrast sensitivity function (CSF) with luminance as described below. After luminance correction, good correlation was obtained with the subjective tests.

The luminance and chrominance CSF of the human visual system has been measured for various retinal illumination levels. The luminance CSF variation was measured by Floris L. Van Nes and Maarten Bouman, "Spatial modulation transfer in the human eye," Journal of Optical Society of America, vol. 57, issue 3, pp. 401-406, 1967 and the chrominance CSF variation by G J Van der Horst and Maarten Bouman, "Spatiotemporal chromaticity discrimination," Journal of Optical Society of America, vol. 59, issue 11, 1969. These measurements show a variation in peak sensitivity of about a factor of 8 for luminance and 5 for chrominance over retinal illumination levels which change by about a factor of 100.

Since the retinal illumination can change by about a factor of 100 between the lightest to darkest area on a page, the CSF peak sensitivity and shape can change significantly. The function is estimated by the average local luminance on the page, and a spatially dependent CSF is applied to the image. This correction is similar to the luminance masking in adaptive image dependent compression. See G J Van der Horst and Maarten Bouman, "Spatiotemporal chromaticity discrimination," Journal of Optical Society of America, vol. 59, issue 11, 1969.

The luminance dependent CSF performed better than a fixed CSF in the visibility model, when compared to subjective measurements of a set of test color patches ranked by human observers for watermark visibility. Results of our model with and without luminance correction are compared to S-CIELAB in Section 2, Visual Model Comparison. The method of applying a spatially dependent CSF which depends on local image luminance is described in Section 3, Pyramid Processing Method.

The visibility model is then used to embed watermark into images with equal visibility. During the embedding stage, the visibility model can predict the visibility of the watermark signal and then adjust the embedding strength. The result will be an embedded image with a uniform watermark signal visibility, with the embedding strength varying depending on the cover image's content. This method was compared to a uniform strength embed in terms of both visibility and robustness, and the results are shown in Section 4, Watermark Equal Visibility Embed.

Visual Model Comparison

Psychophysical Experiment

To test the full-color visibility model a psychophysical experiment was conducted. The percept of degradation caused by the watermark was compared to the results of the visibility model, as well as to the S-CIELAB metric.

A set of observers were asked to rate their perception of the image degradation of 20 color patch samples using a quality ruler. The quality ruler (illustrated in [FIG. 13A]) increases in watermark strength from left (B) to right (F). The color samples were viewed one at a time at a viewing distance of approximately 12 inches. The samples were presented using the Latin square design (see Geoffrey Keppel and Thomas Wickens, "Design and analysis: A researcher's handbook." Prentice Hall, pp. 381-386, 2004) to ensure a unique viewing order for each observer.

Figure 13A:
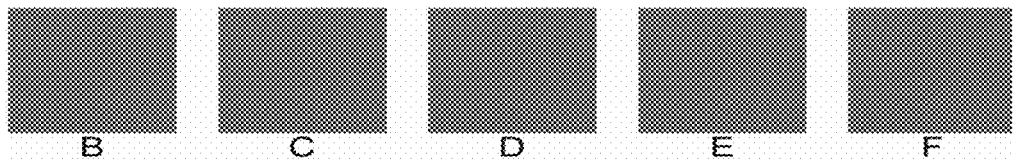
FIG. 13A corresponds to Appendix D's FIG. 1, which shows a quality ruler increasing in degradation from B (slight) to F (strong).

[FIG. 13A] shows quality ruler increasing in degradation from B (slight) to F (strong).

All 22 participants passed the Ishihara color test. There were eight female and 14 male participants, with an average age of 43. Their professions and experience varied. Four people had never participated in a visibility experiment, 12 had some experience and six had participated on several occasions.

Figure 13B:
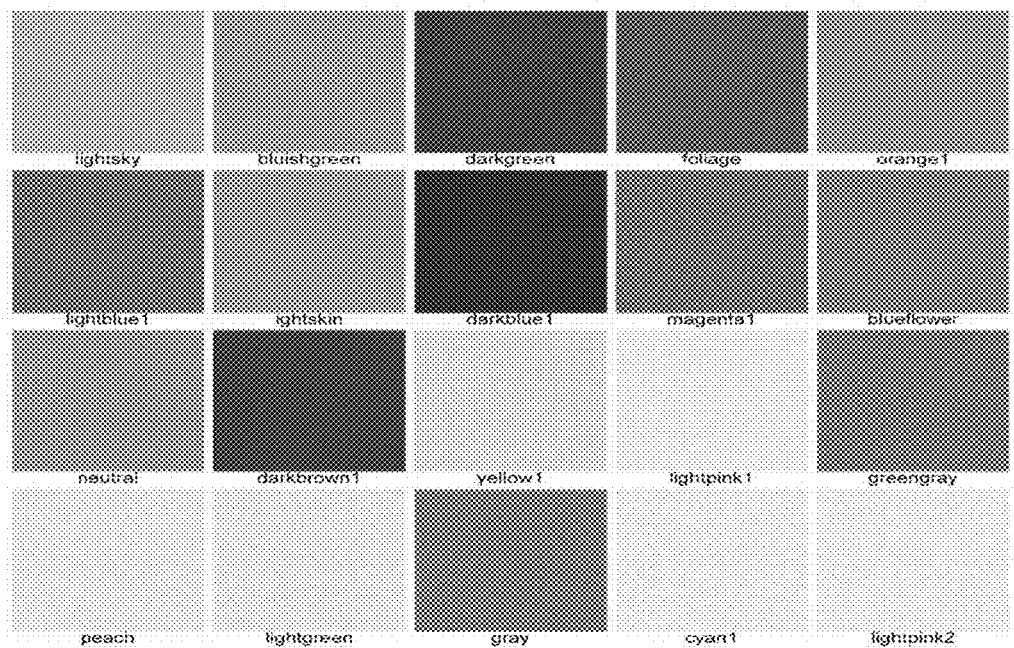
FIG. 13B corresponds to Appendix D's FIG. 2, which shows thumbnails of the 20 color patch samples with a watermark applied.

Thumbnails of the 20 color patches are illustrated in [FIG. 13B]. The color samples were chosen largely based on the results of a previous experiment; where it was observed that the visibility model had difficulty accurately predicting the observer response with darker color patches. Additionally, one color patch had a much higher perceived and predicted degradation. Ten of the original samples were included in the second experiment. Dark patches, patches which were expected to have a higher perception of degradation and memory colors were added to complete the set of 20 patches. The experiment and the quality ruler patches were all printed with an Epson Stylus 4880 on Epson professional photo semi-gloss 16 inch paper.

[FIG. 13B] shows thumbnails of the 20 color patch samples with the watermark applied.

Figure 14:
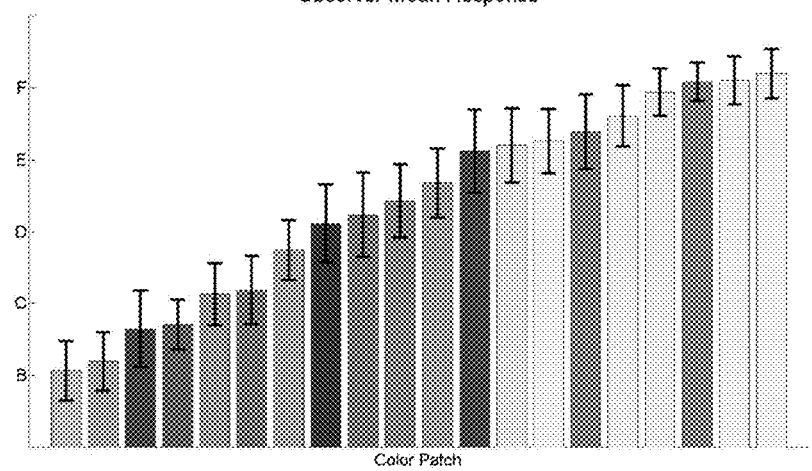
FIG. 14 corresponds to Appendix D's FIG. 3, which shows a mean observer responses with 95% confidence intervals for color patches.

The mean observer scores for the 20 color samples are plotted in [FIG. 14]. In general the colors on the far right are lighter. As discussed in the previous experiment, the cyan1 patch was observed to have a higher level of degradation. In this second experiment, other colors with similar properties were determined to have a similarly high perception of degradation.

[FIG. 14] shows the mean observer responses with 95% confidence intervals.

Validation of the Visibility Model

The motivation for the psychophysical experiment is to test how well the proposed full-color visibility model correlates to the perception of the degradation caused by the watermark signal. The model without and with the luminance adjustment are plotted in [FIG. 15] and [FIG. 16], respectively.

Figure 15:
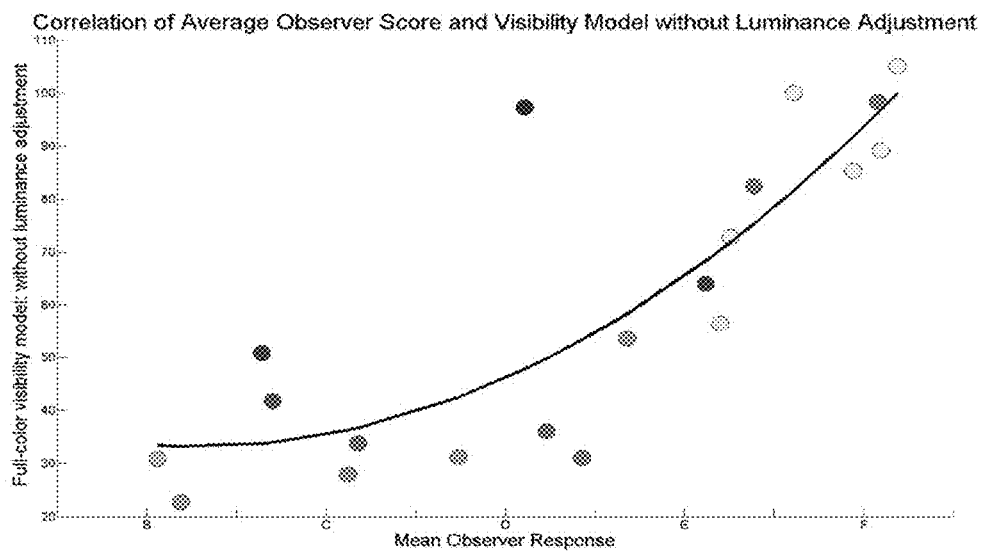
FIG. 15 corresponds to Appendix D's FIG. 4, which shows mean observer response compared with a proposed visibility model.

[FIG. 15] shows mean observer response compared with the proposed visibility model. The solid black line is the polynomial trendline.

Figure 16:
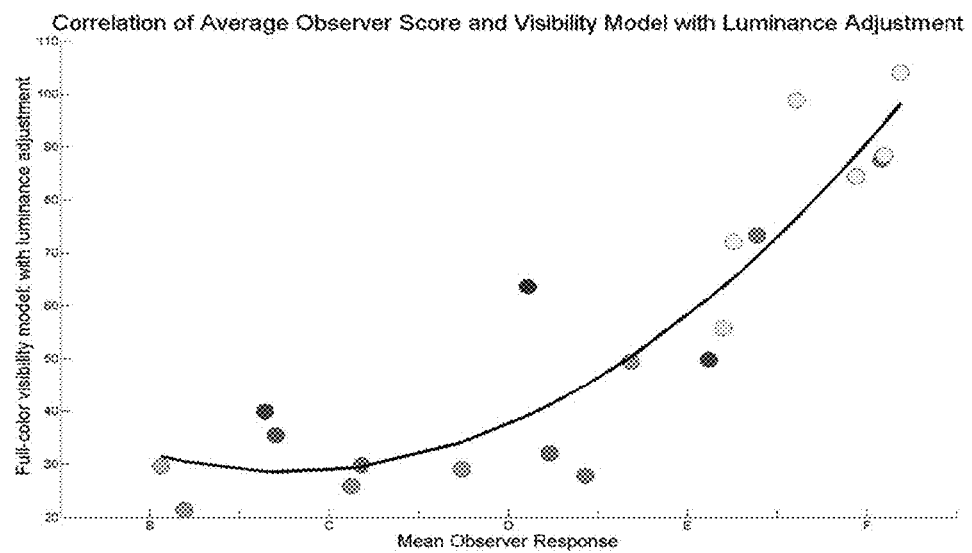
FIG. 16 corresponds to Appendix D's FIG. 5, which shows mean observer response compared with the proposed visibility model with luminance adjustment.

[FIG. 16] shows mean observer response compared with the proposed visibility model with luminance adjustment.

The addition of the luminance adjustment primarily affected the darker color patches, darkgreen, foliage and darkblue1. CIEDE94 and CIEDE2000 color difference models were also considered, however there was not a clear advantage to using the more complex formulas.

Figure 17:
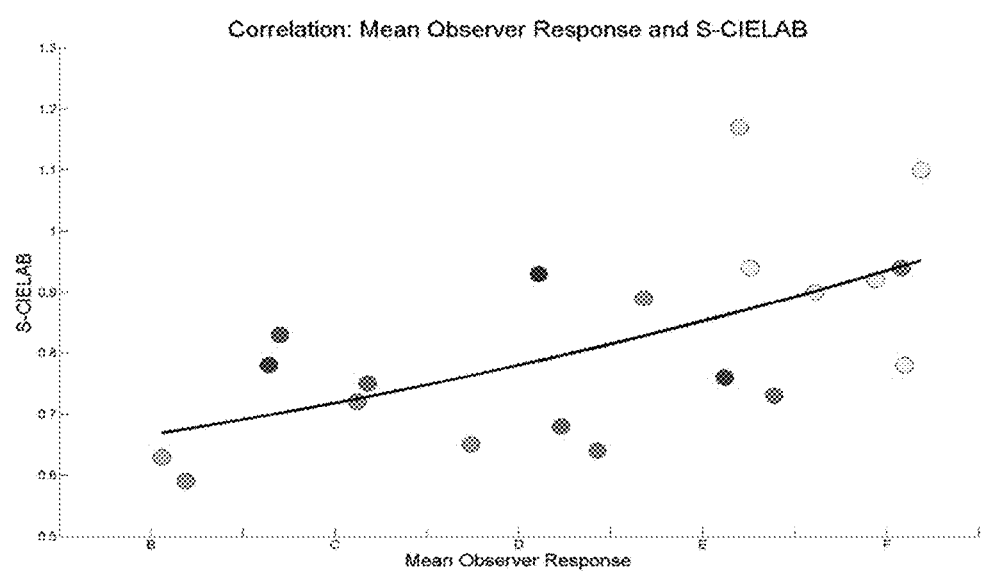
FIG. 17 corresponds to Appendix D's FIG. 6, which shows mean observer response compared with S-CIELAB.

[FIG. 17] shows Mean observer response compared with S-CIELAB.

The S-CIELAB values are also plotted against the mean observer response [FIG. 17].

Two different methods were used to compare the different metrics to the observer data, Pearson's correlation and the coefficient of determination ($R^2$). Both correlation techniques describe the relationship between the metric and observer scores. The coefficient indicates the relationship between two variables on a scale of +/−1, the closer the values are to 1 the stronger the correlation is between the objective metric and subjective observer results. The correlations are summarized in Table 1.

TABLE 1

| | Visibility model using CIE $\Delta E_{76}$ | | |
| --- | --- | --- | --- |
| | No Adjust | With Adjust | S-CIELAB |
| Pearson | 0.81 | 0.86 | 0.61 |
| $R^2$ | 0.70 | 0.85 | 0.38 |

Table 1: Pearson and $R^2$ correlation between the observers' mean responses and the objective metrics. For both tests, the proposed full-color visibility model with the luminance adjustment shows the highest correlation.

As shown in Table 1, all three objective methods have a positive correlation to the subjective results with both correlation methods. The full-color visibility model with the luminance adjustment had the highest correlation with both the Pearson and $R^2$ correlation tests, while S-CIELAB had the lowest.

Pyramid Processing Method

In image fidelity measures, the CSF is commonly used as a linear filter to normalize spatial frequencies such that they have perceptually equal contrast thresholds. This can be described by the following shift invariant convolution:

$$\tilde{f}(x, y) = h(x, y) * f(x, y) = \sum_m \sum_n h(m, n) f(x - m, y - n), \quad (1)$$

where f(x,y) is an input image, h(x,y) is the spatial domain CSF, and $\tilde{f}$(x,y) is the frequency normalized output image.

For our luminance dependent CSF model, we allow the CSF to vary spatially according to the local luminance of the image, i.e.:

$$\tilde{f}(x, y) = \sum_m \sum_n h(m, n; x, y) f(x - m, y - n). \quad (2)$$

Since evaluating this shift variant convolution directly can be computationally expensive, we seek an approximation that is more efficient.

The use of image pyramids for fast image filtering is well-established. An image pyramid can be constructed as a set of low-pass filtered and down-sampled images $f_l(x,y)$, typically defined recursively as follows:

$$f_0(x,y)=f(x,y) \quad (3)$$

and $$f_l(x, y) = \sum_m \sum_n h_0(m, n) f_{l-1}(2x - m, 2y - n) \quad (4)$$

for l>0 and generating kernel $h_0(m,n)$. It is easily shown from this definition that each level $f_l(x,y)$ of an image pyramid can also be constructed iteratively by convolving the input image with a corresponding effective kernel $h_l(m,n)$ and down-sampling directly to the resolution of the level, as follows:

$$f_l(x, y) = \sum_m \sum_n h_l(m, n) f_0(2^l x - m, 2^l y - n), \quad (5)$$

where $h_l(m,n)$ is an l-repeated convolution of $h_0(m,n)$ with itself.

For image filtering, the various levels of an image pyramid are used to construct basis images of a linear decomposition representing the point-spread response of the desired filtering, i.e.:

$$\tilde{f}(x, y) = \sum_l a_l \tilde{f}_l(x, y). \quad (6)$$

where $\alpha_l$ is the coefficient of the basis function $\tilde{f}_l(x,y)$ obtained by up-sampling the corresponding pyramid level $f_l(x,y)$ back to the base resolution.

We use the effective convolution kernel $h_l(x,y)$ as an interpolating kernel, i.e., $$\tilde{f}_l(x, y) = 4^l \sum_m \sum_n h_l(x - 2^l m, y - 2^l n) f_l(m, n), \quad (7)$$

such that each basis function $\tilde{f}_l(x,y)$ can be described by a simple shift-invariant convolution of the input image with a composite kernel $\tilde{h}_l(x,y)$:

$$\tilde{f}_l(x,y) = \tilde{h}_l(x,y) * f(x,y), \quad (8)$$

where $\tilde{h}_l(x,y) = h_l(x,y) * h_l(x,y)$. Thus, considering Eq. (6), we assert that the optimal representation is obtained by minimizing the sum of the squared error between the desired CSF and the Gaussian representation; i.e., $$a = \underset{a}{\operatorname{argmin}} E_g \quad (8)$$

where $$E = \sum_x \sum_y \left( h(x, y) - \sum_l a_l \tilde{h}_l(x, y) \right)^2, \quad (9)$$

and $a=[a_1, a_2, \ldots]$. This is a standard linear least-squares problem and can be solved using standard software packages, like Matlab® or GNU Octave. Further, the optimization can be pre-calculated for each local luminance of interest and stored in a look-up table, noting that for our application each coefficient is spatially varying according to the local luminance level $L_f=L_f(x,y)$ of f(x,y), i.e., $$a_l=a_l(L_f)=a_l(L_f(x,y)).$$

While the development of our approach has been conducted for basis image at the resolution of the input image, the procedure can be conducted within a multi-resolution scheme, reducing the calculation of the spatially variant convolution in Eq. (3.2) into a pyramid reconstruction with spatially variant analysis coefficients.

Watermark Equal Visibility Embed

Figure 18:
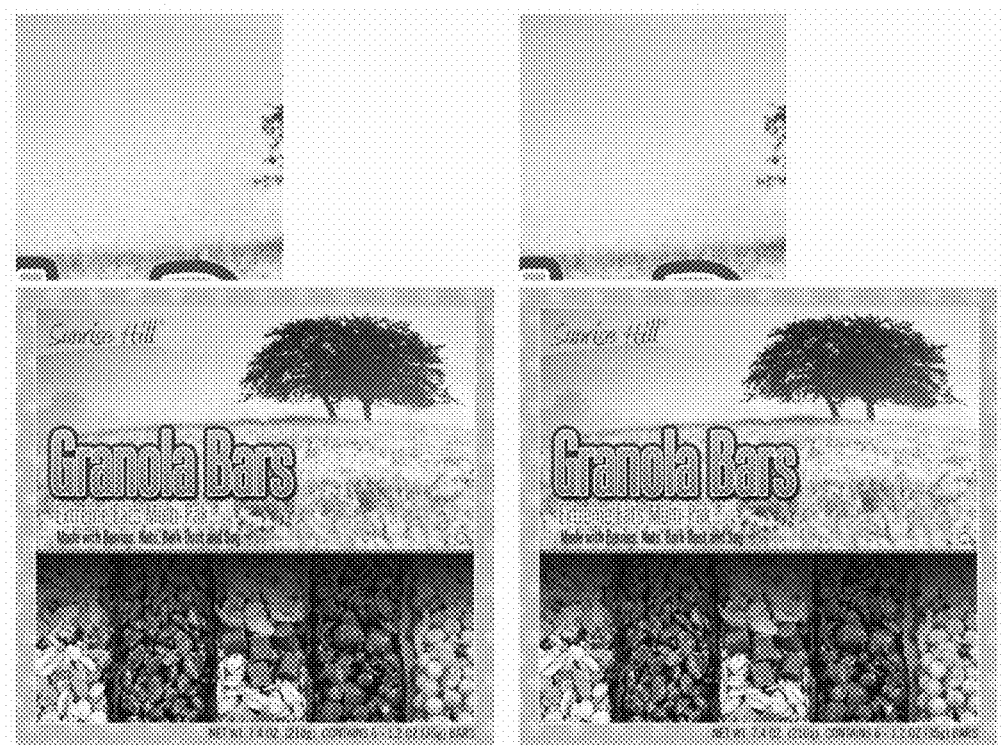
FIG. 18 corresponds to Appendix D's FIG. 7, which shows watermark embedding with uniform signal strength (left) and equal visibility from a visibility model (right). The insets are magnified to show image detail.

[FIG. 18] shows an example from a cover image mimicking a package design. The design has two embedding schemes: on the left the watermark signal strength is uniform across the whole image, and on the right the watermark signal strength is adjusted based on the prediction from the visibility model. Since the human visual system is approximately a peak error detector, the image degradation caused by the watermark signal is determined by the most noticeable area. In this example, the hilly area in the background has the most noticeable degradation, as shown in the magnified insets. The visibility model is used to find this severe degradation. The signal strength in this area is reduced which improves the overall visibility of the embedded image, making it more acceptable. The total watermark signal on the right is 40% more than that on the left, but visually, the marked image on the right is preferable to the left one, because the degradation in the most noticeable area is reduced significantly.

Figure 19:
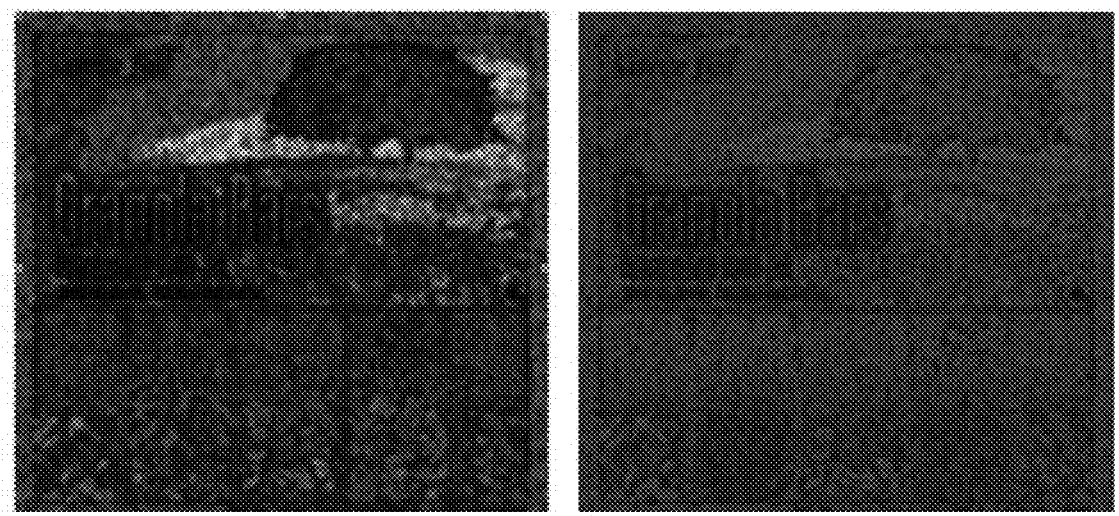
FIG. 19 corresponds to Appendix D's FIG. 8, which shows visibility map from uniform signal strength embedding (left) and equal visibility embedding (right) from FIG. 18.

[FIG. 19] shows the calculated visibility for the uniform signal strength embedding (left) and the visibility model adjusted embedding (right). Notice that the visibility map is smoother on the right than on the left.

In terms of watermark detection, the embedding scheme with visibility model based adjustment can accommodate more watermark signal without creating a very noticeable degradation, thus making the detection more robust. To demonstrate the powerfulness of applying the visibility model, we performed a stress test with captures of 4 images from the two embedding schemes at various distances and perspectives. The other 3 images from the uniform visibility embedding are shown in [FIG. 20]. Their visibility maps are not included but instead the standard deviation of each visibility map is listed in Table 2. The percentage of successful detection is shown in Table 3.

These two tables show that the equal visibility embedding showed a significant visibility improvement over the uniform strength embedding scheme, together with robustness that was about the same or better.

[FIG. 18] shows watermark embedding with uniform signal strength (left) and equal visibility from the visibility model (right). The insets are magnified to show image detail.

[FIG. 19] shows visibility map from uniform signal strength embedding (left) and equal visibility embedding (right).

Figure 20:
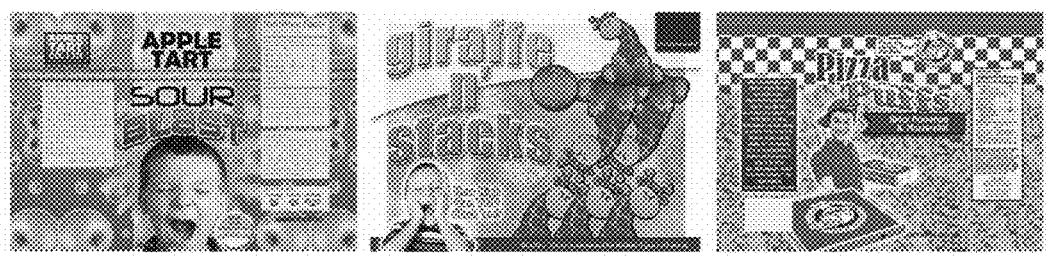
FIG. 20 corresponds with Appendix D's FIG. 9, which shows Apple tart, Giraffe stack and Pizza puff design used in tests.

[FIG. 20] shows Apple tart, Giraffe stack and Pizza puff design used in tests.

Table 2 shows standard deviation of the visibility maps on the 4 images from the two embedding schemes.

TABLE 2

| Test image | Uniform strength embedding | Equal visibility embedding |
| --- | --- | --- |
| Granola | 18.32 | 9.71 |
| Apple Tart | 8.19 | 4.96 |
| Giraffe Stack | 16.89 | 11.91 |
| Pizza Puff | 11.81 | 8.27 |

Table 3 shows detection rate on 4 images from the two embedding schemes, out of 1000 captures each image/embedding.

TABLE 3

| Test image | Uniform strength embedding | Equal visibility embedding |
| --- | --- | --- |
| Granola | 18% | 47% |
| Apple Tart | 50% | 58% |
| Giraffe Stack | 47% | 49% |
| Pizza Puff | 63% | 61% |

Conclusions

A full color visibility model has been developed which has good correlation to subjective visibility tests for color patches degraded with a watermark. The best correlation was achieved with a model that applied a luminance correction to the CSF.

The model was applied during the watermark embed process, using a pyramid based method, to obtain equal visibility. Better robustness and visibility was obtained with equal visibility embed than uniform strength embed.

Discussion

One goal of a color visibility model is to create an objective visual degradation model due to digital watermarking of an image. For example, a model may predict how noticeable or visible image changes will be due to watermark insertion. Highly noticeable changes can be reduced or modified to reduce watermark visibility, and/or to create equal watermark visibility (or lack thereof) across an image. For example, an error metric above or relative to the standard "Just Noticeable Difference" (JND) can be used to determine noticeable changes.

Figures 21, 22:
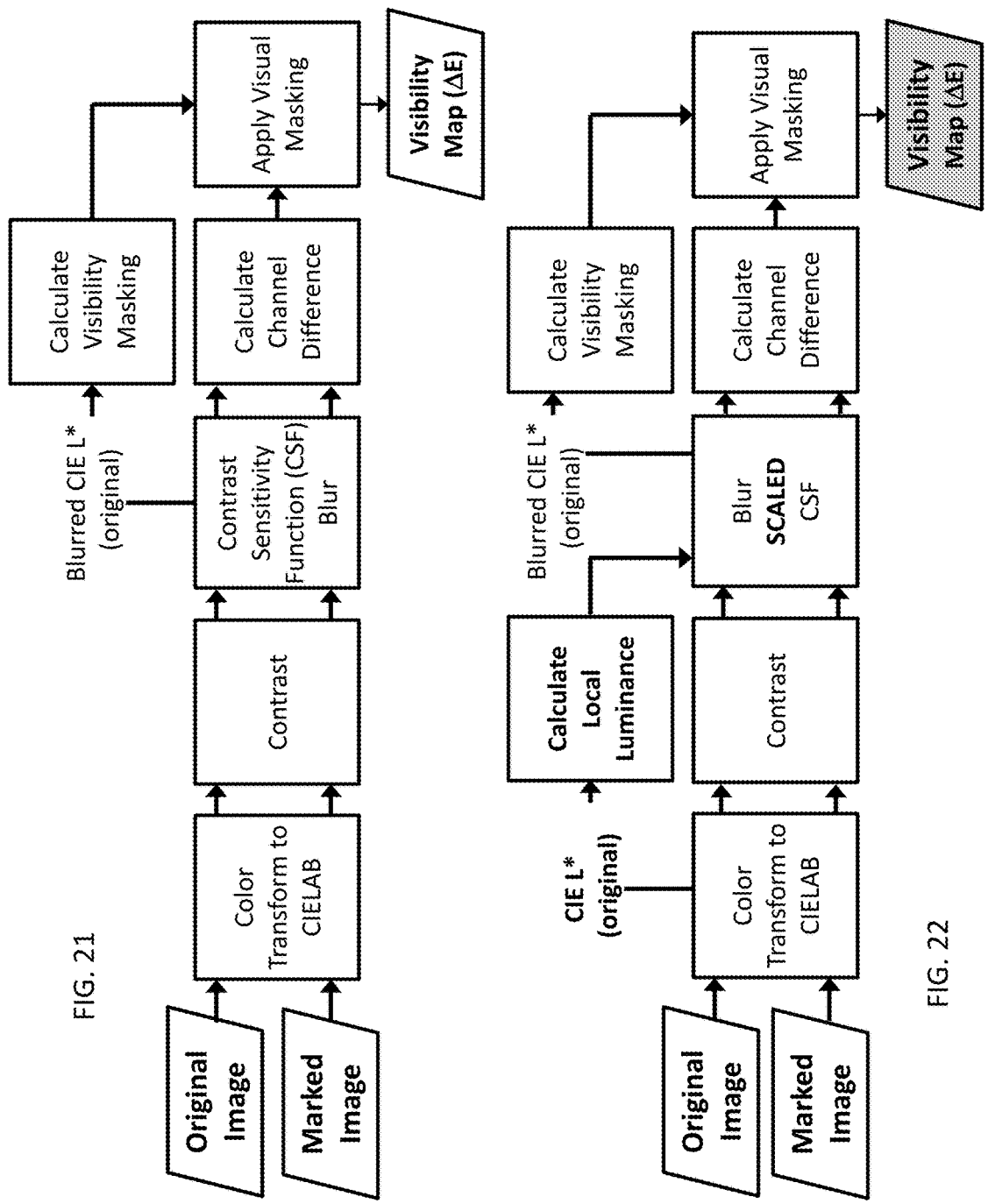
FIG. 21 is a block diagram for a color visibility model.
FIG. 22 is a block diagram for a color visibility model with CSFs varied according to image local luminance.

In a first implementation, with reference to FIG. 21, a digital watermarked image is compared to a processed version of an original image to determine a visibility map. The visibility map can be used to weight watermark embedding of the original image, e.g., to reduce watermark strength in high visibility areas. The process starts with conversion of an original image into the so-call CIELAB space, resulting in L*, a* and b* color representations. As mentioned above, the L* coordinate represents the perceived lightness or luminance, an L* value of 0 indicates black and a value of 100 indicates white. The CIE a* coordinate position goes between "redness" (positive) and "greenness" (negative), while the CIE b* goes between "yellowness" (positive) and "blueness" (negative). The original image is digitally watermarked and then converted into the CIELAB space. For example, the watermarking for this initial process may use a uniform embedding strength across the entire image.

Contrast between the original image and the marked image can be determined, and then contrast sensitivity functions (CSFs) can be applied to each of the L*, a* and b* channels. For example, the L* CSFs discussed in Daly, "Visible differences predictor: an algorithm for the assessment of image fidelity," F. L. van Nes et al. "Spatial Modulation Transfer in the Human Eye," J. Opt. Soc. Am., Vol. 57, Issue 3, pp. 401-406 (1967), or Johnson et al, "On Contrast Sensitivity in an Image Difference Model," PICS 2002: Image Processing, Image Quality, Image Capture Systems Conference, Portland, Oreg., April 2002; p. 18-23 (which is herein incorporated herein in its entirety), can be used. In other cases a bandpass filter, with a drop off toward low-frequencies, can be applied to the L*. The processed or blurred L* channel (from the original image) can be used to determine visibility masking. For example, areas of high contrast, edges, features, high variance areas, can be identified for inclusion of more or less watermarking strength. Some areas (e.g., flat area, edges, etc.) can be entirely masked out to avoid watermarking all together.

For the a* and b* channels, chrominance CSFs can be applied to the respective channels, e.g., such CSFs as discussed in Johnson et al, "Darwinism of Color Image Difference Models;" G. J. C. van der Horst et al., "Spatiotemporal chromaticity discrimination," J. Opt. Soc. Am., 59(11), 1482-1488, 1969; E. M. Granger et al., "Visual chromaticity modulation transfer function," J. Opt. Soc. Am., 63(9), 73-74, 1973; K. T. Mullen, "The contrast sensitivity of human colour vision to red-green and blue-yellow chromatic gratings," J. Physiol., 359, 381-400, 1985; each of which are hereby incorporated herein by reference in their entirety. In other cases, a low-pass filter is used which has a lower cut-off frequency relative to the CSF of luminance.

Channel error difference can then be determined or calculated. For example, on a per pixel basis, L*, a* and b* data from the original image are compared to the blurred (e.g., processed with respective CSFs) L*, a* and b*channels from the watermarked image. One comparison utilizes $\Delta E_{76}$: Using $(L_1^*, a_1^*, b_1^*)$ and $(L_2^*, a_2^*, b_2^*)$, two colors in L*a*b*, the error between two corresponding pixel values is:

$$\Delta E_{ab}^* = \sqrt{(L_2^* - L_1^*)^2 + (a_2^* - a_1^*)^2 + (b_2^* - b_1^*)^2},$$

where $\Delta E_{ab}^* = 2.3$ corresponds to a JND (just noticeable difference). Other comparisons may utilize, e.g., $\Delta E_{94}$ or $\Delta E_{2000}$.

Of course, and more preferably used, is an error determination for the blurred (CSF processed) L*a*b* from the original image and the CSF blurred L*a*b* from the watermarked image.

The output of the Calculate Channel Difference module identifies error metrics. The error metrics can be used to identify image areas likely to include high visibility due to the inserted digital watermark signal. We sometimes refer to this output as an "error map". Typically, the lower the error, the less visible the watermark is at a particular area, image blocks or even down to a signal pixel.

The visibility mask and the error map can be cooperatively utilized to guide digital watermarking. For example, watermark signal gain can be varied locally according to the error map, and areas not conducive to receive digital watermark, as identified in the visibility mask, can altogether be avoided or receive a further signal reduction.

One limitation of the FIG. 21 model is that it does not take into account local luminance influences for Contrast Sensitivity Functions (CSF), particularly for the a* and b* chrominance channels. With reference to FIG. 22, we propose a color visibility model for use with a digital watermark embedder that seeks equal visibility across an image by locally varying watermarking embedding strength based on predicted visibility influenced, e.g., by local image luminance. A CSF for each color channel can be varied spatially depending on the luminance of the local image content.

The luminance content of the original image provides potential masking of changes due to watermarking in chrominance as well as luminance. For example, where a watermark signal comprises mostly high frequency components, the masking potential of the original image is greater at regions with high frequency content. We observe that most high frequency content in a typical host image is in the luminance channel. Thus, the luminance content of the host is the dominant contributor to masking potential for luminance changes and chrominance changes for high frequency components of the watermark signal.

Returning to FIG. 22, we may add several modules relative to the FIG. 21 system, e.g., "Calculate Local Luminance" and "blur SCALED CSF" modules. The FIG. 22 visibility model system uses separate CSFs for contrast variations in luminance and chrominance (red-green and blue-yellow) channels. The width, characteristics or curve of the CSF in each channel can be scaled or modified depending on the luminance of the local image content. For example, for a given pixel, local luminance in a neighborhood around the pixel can be evaluated to determine a local brightness value. The local brightness value can be used to scale or modified a CSF curve. The neighborhood may include, e.g., 4, 8 or more pixels. In some cases, the CSF is adjusted so that more blurring occurs as the luminance of the local region decreases. The error difference between the contrast of the blurred (or unblurred) original and the blurred marked image can be measured using a color difference metric, e.g., $\Delta E76$, $\Delta E94$ or $\Delta E2000$.

Figure 23A:
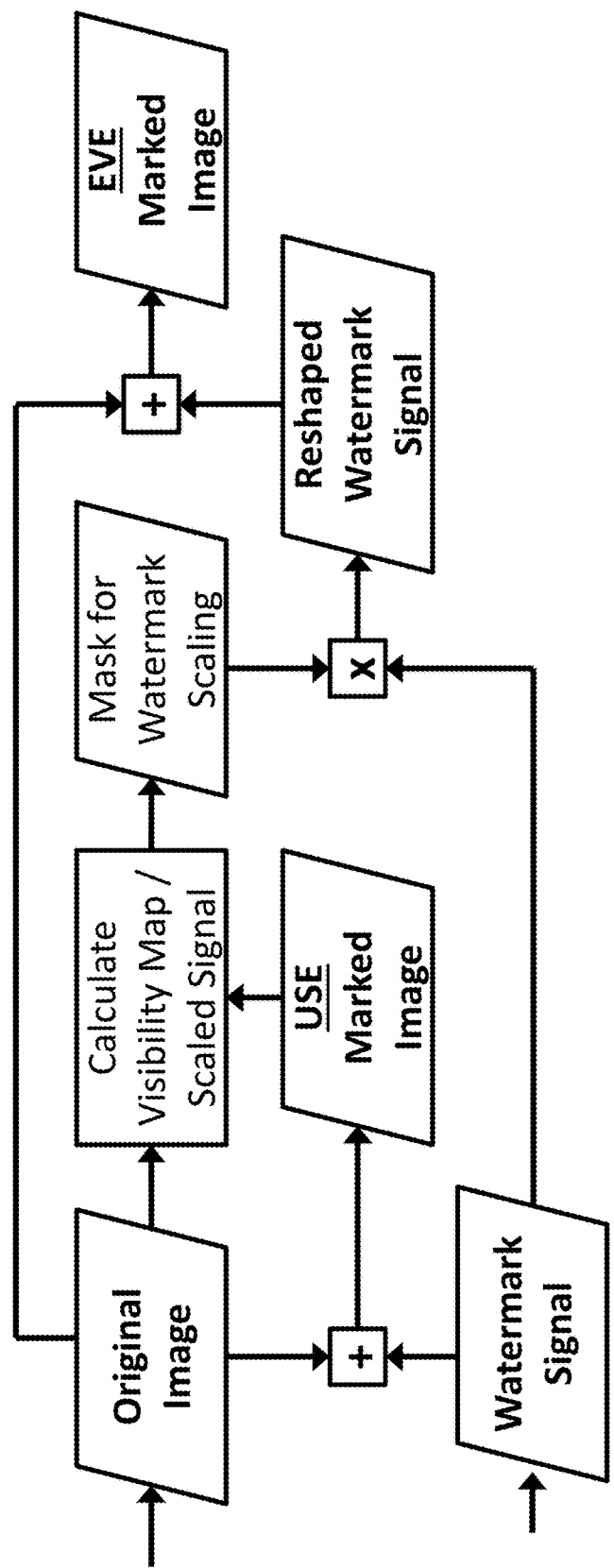
FIG. 23A is a block diagram for a color visibility model to achieve equal visibility embedding (EVE).

With reference to FIG. 23A, one objective may include embedding digital watermarking into images with equal visibility. That is, the image includes watermarking embedded therein at different signal strength values to achieve uniform or equal visibility. During the embedding stage, the visibility model can predict the visibility of the watermark signal and then adjust the embedding strength. The result will be an embedded image with a uniform watermark signal visibility, with the embedding strength varying locally across the image depending on characteristics of the cover image's content. For example, a visibility map generated from the FIG. 22 system is used to reshape (e.g., locally scale according to an error map and/or mask embedding or avoidance areas according to a visibility map) a watermark signal. The original signal is then embedded with the reshaped watermark signal to create an equal visibility embedded (EVE) image. In such a case, the watermark signal locally varies to achieve an overall equal visibility.

Figure 23B:
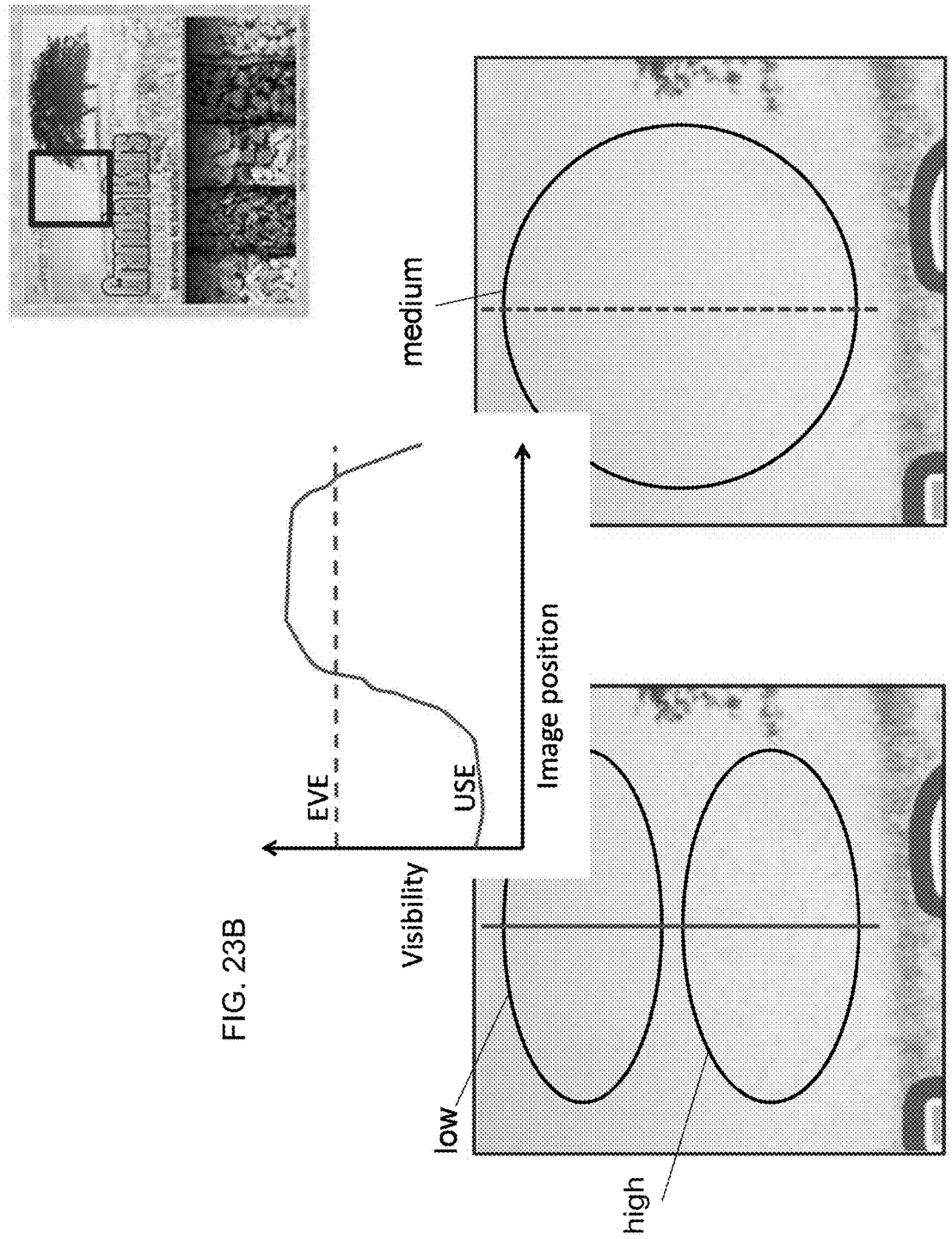
FIG. 23B is a diagram showing EVE embedding compared to uniform embedding.

Some visibility advantages of EVE vs. uniform strength embedding (USE) are shown in FIG. 23B. The visibility of the USE varies from area to area, as see in the bottom left image. In comparison, when embedding the same image area with EVE (bottom right image), the watermark visibility appears equal. The bottom left and right images represent the same image area highlighted in blue in the upper right image.

Concluding Remarks

Having described and illustrated the principles of the technology with reference to specific implementations, it will be recognized that the technology can be implemented in many other, different, forms. To provide a comprehensive disclosure without unduly lengthening the specification, applicant hereby incorporates by reference each of the above referenced patent documents in its entirety.

The methods, processes, components, apparatus and systems described above may be implemented in hardware, software or a combination of hardware and software. For example, the watermark encoding processes and embedders may be implemented in software, firmware, hardware, combinations of software, firmware and hardware, a programmable computer, electronic processing circuitry, with a processor, parallel processors or other multi-processor configurations, and/or by executing software or instructions with one or more processors or dedicated circuitry. Similarly, watermark data decoding or decoders may be implemented in software, firmware, hardware, combinations of software, firmware and hardware, a programmable computer, electronic processing circuitry, and/or by executing software or instructions with a processor, parallel processors or other multi-processor configurations.

The methods and processes described above (e.g., watermark embedders and detectors) also may be implemented in software programs (e.g., written in C, C++, Visual Basic, Java, Python, Tcl, Perl, Scheme, Ruby, executable binary files, etc.) stored in memory (e.g., a computer readable medium, such as an electronic, optical or magnetic storage device) and executed by a processor (or electronic processing circuitry, hardware, digital circuit, etc.).

While one embodiment discusses inverting the polarity in a second color channel (e.g., a 'b' channel), one could also invert the polarity in the first color channel (e.g., an 'a' channel) instead. In such a case, the first color channel is then preferably subtracted from the second color channel.

The particular combinations of elements and features in the above-detailed embodiments (including Appendix D) are exemplary only; the interchanging and substitution of these teachings with other teachings in this and the incorporated-by-reference patent documents are also contemplated.

What is claimed is:

1. An apparatus comprising:
   memory for storing: i) a luminance contrast sensitivity function (CSF1), ii) a chrominance contrast sensitivity function (CSF2), and iii) data representing color imagery; and
   one or more electronic processors configured for:
   predicting degradation of image areas associated with an application of digital watermarking in the data representing color imagery by applying the CSF1 and the CSF2 to the data representing color imagery, in which the CSF1 varies depending on luminance values associated with local regions of the data representing color imagery and in which the CSF1 is used for processing luminance data and the CSF2 is used for processing chrominance data;
   altering the data representing color imagery with digital watermarking, in which the digital watermarking is guided based on results obtained from said predicting including predicted degradation of image areas, wherein the digital watermarking uses weightings associated with local regions of the data representing color imagery, said altering yielding locally varied digital watermarked data representing color imagery.

2. The apparatus of claim 1 in which the CSF1 varies spatially.

3. The apparatus of claim 1 in which the CSF1 varies spatially in terms of spatial width.

4. The apparatus of claim 2 in which the CSF2 varies spatially in terms of spatial width.

5. The apparatus of claim 1 in which said predicting produces image blurring as the predicted degradation, in which the CSF1 varies so that relatively more blurring occurs as luminance of a local image region decreases.

6. The apparatus of claim 1 in which the digital watermarking is guided based on results obtained from said predicting by varying embedding strength across different image areas of the data representing color imagery based on predicted degradation of the different image areas.

7. The apparatus of claim 6 in which predicted degradation of the digital watermarking across the different image areas comprises uniform predicted degradation.

8. The apparatus of claim 1 in which said one or more processors are configured for processing the data representing color imagery with an attention model to predict visual traffic areas.

9. The apparatus of claim 8 in which the digital watermarking is guided based on the results obtained from the predicted visual traffic areas and the predicted degradation of image areas.

10. The apparatus of claim 1 in which the chrominance contrast sensitivity function (CSF2) comprises a blue-yellow contrast sensitivity function and a red-green contrast sensitivity function.

11. The apparatus of claim 1 in which the CSF2 varies depending on luminance values associated with local regions of the data representing color imagery.

12. The apparatus of claim 1 in which said altering the data representing color imagery with digital watermarking embeds a machine-readable code into the data representing color imagery.

13. The apparatus of claim 1 in which the color imagery comprises video.

14. A method comprising:
obtaining color image data;
altering the color image data with digital watermarking, the digital watermarking comprising an information signal, said altering yielding digital watermarked color image data;
comparing the digital watermarked color image data to the color image data to determine a visibility map, the visibility map comprising a luminance contrast sensitivity function (CSF1) and a chrominance contrast sensitivity function (CSF2);
weighting the digital watermarking according to the visibility map so that local image areas within the color image data are weighted differently, said weighting yielding weighted digital watermarking;
altering the color image data with the weighted digital watermarking to yield locally varied digital watermarked color image data.

15. The method of claim 14 in which the CSF1 introduces image blurring, and in which the CSF1 varies so that relatively more blurring occurs as luminance of a local image region decreases.

16. The method of claim 14 in which said weighting varies digital watermark embedding strength across different local image regions of the color image data to yield uniform predicted visibility of the digital watermarking across the color image data.

17. The method of claim 14 in which the CSF1 varies spatially in terms of spatial width.

18. The method of claim 14 in which the CSF2 varies spatially in terms of spatial width.

19. The method of claim 14 in which the CSF2 comprises a blue-yellow contrast sensitivity function and a red-green contrast sensitivity function.

20. The method of claim 14 in which the color image data represents video data.

* * * * *